June 27, 1967 B. J. LAZAN 3,327,812
DAMPING MEANS

Filed Oct. 14, 1965 3 Sheets-Sheet 1

INVENTOR.
BENJAMIN J. LAZAN
BY
Merchant, Merchant + Gould
ATTORNEYS

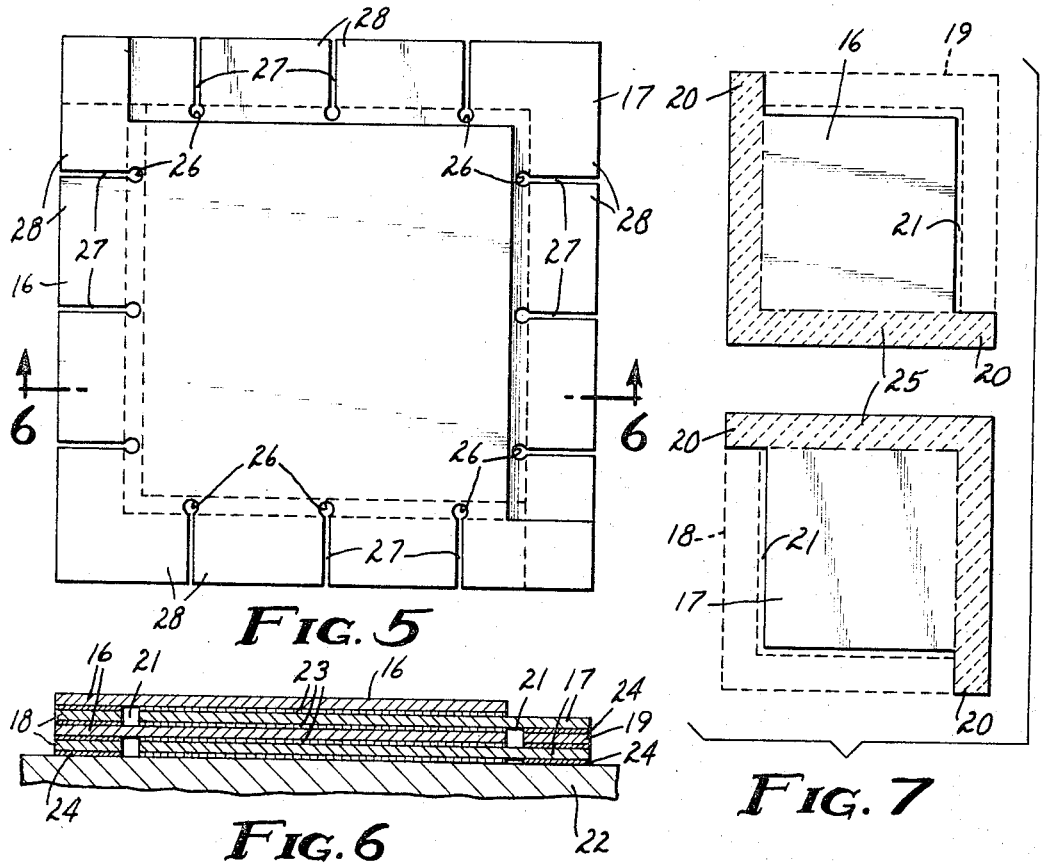
FIG. 5
FIG. 6
FIG. 7
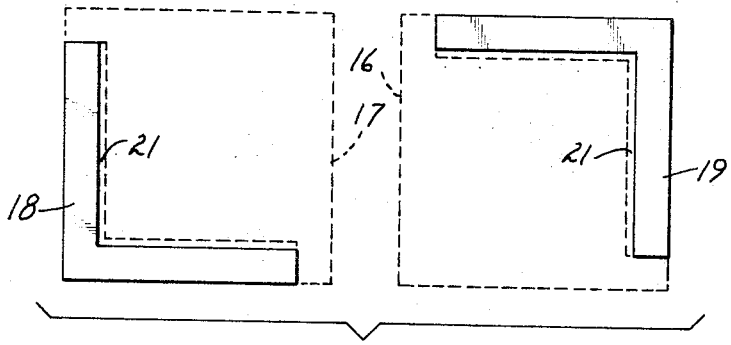
FIG. 8
INVENTOR.
BENJAMIN J. LAZAN
BY
Merchant, Merchant & Gould
ATTORNEYS INVENTOR.
BENJAMIN J. LAZAN
BY
Merchant, Merchant & Gould
ATTORNEYS

United States Patent Office 3,327,812
Patented June 27, 1967

3,327,812
DAMPING MEANS
Benjamin J. Lazan, St. Paul, Minn., assignor to B. J. Lazan, Jeannette W. Lazan, and First National Bank of Minneapolis, as trustees
Filed Oct. 14, 1965, Ser. No. 496,085
14 Claims. (Cl. 188—1)

This invention relates to vibration damping means for structural members such as beams, panels and the like, and is in the nature of an improvement on the structures disclosed in my prior United States Letters Patent 3,159,249, issued December 1, 1964, and entitled "Damping Means."

In the damping of vibration in various structural and machine members subject to excitation, it has been found that a layer of viscoelastic damping adhesive applied to a member and a constraining metal band or sheet adhered to the exterior surface of the adhesive material produces a cyclic shear stress in the viscoelastic layer during vibration of the member to provide some damping. Often, the damping effect of this arrangement is insufficient to produce the desired results, and damping means such as tape comprising a plurality of layers of alternate adhesive material and thin metal bands or sheets are sometimes employed. Normally, the layers of viscoelastic material and elements of metal or other flexible material, are each but a few thousandths of an inch thick. It has been found that a multiplicity of layers of viscoelastic material and alternate layers of other material having a higher modulus of rigidity than the viscoelastic material, such as metal, has substantially the same effect as a single layer of viscoelastic material and a single layer of other material totaling the thickness of said multiplicity of layers, the cyclic shear strains in the viscoelastic layers becoming progressively smaller from the innermost layer outwardly to the outermost layer.

An important object of this invention is the provision of damping means including a plurality of sheets or bands of flexible material disposed in overlapping spaced relation, a plurality of layers of viscoelastic material between such sheets or bands and adhered thereto, and means for attaching the damping means to an underlying surface of a structural member in such manner that, under cyclic axial or flexural loading of the member, the shear strain in successive layers is at least the same or progressively greater from the innermost to the outermost of said layers. One such arrangement is disclosed in my prior patent, above identified, wherein sheets of flexible material and alternate layers of viscoelastic material are formed as corrugations and applied to the structural member to be dampened, the damping means including any of several arrangements for supporting the sheets and layers in their corrugated formation.

At the time of filing the application which matured into U.S. Patent No. 3,159,249, the significance of the arrangement hereinafter disclosed was not apparent, and I have since discovered that efficient damping could be achieved by adhering the damping means intermediate the side edges thereof directly to the structural member with a viscoelastic layer and rigidly anchoring the side edges of the damping means to the structural member. Hence, another object of this invention is the provision of damping means which conforms to the normal surface contour of the structural member to which it is applied, so as to occupy a minimum of space.

Still another important object of this invention is the provision of damping means which provides maximum damping with the addition of minimum weight to the structure to which it is applied.

Another object of this invention is the provision of damping means which may be easily varied to provide proper damping of structural members subject to different cyclic axial or bending loads.

Yet another object of this invention is the provision of improved damping means for members subject to biaxial as well as uniaxial bending.

Another object of this invention is the provision of a novel method of effectively damping vibration of a structural member.

Another object of this invention is the the provision of damping means for supporting various articles from structure subject to vibration, whereby to minimize vibration in the article supported by the damping means.

To the above ends I provide a layered stack construction or sandwich comprising a plurality of sheet-like elements of flexible material such as thin sheet metal or foil, disposed in overlapping spaced relationship and adhered together by layers of adhesive viscoelastic material. Alternate elements are laterally offset from or staggered with respect to adjacent elements, whereby each of said elements has one edge portion projecting laterally outwardly of the adjacent edges of adjacent elements, the layers of the viscoelastic material being disposed laterally inwardly of said projected edge portions. The lowermost or innermost element is adapted to be adhered directly to the structural member to be dampened, by a layer of viscoelastic material, and the projected edge portions at opposite sides of the damping construction are rigidly connected by spacers therebetween and are rigidly attached to the underlying structural member surface independently of the innermost layer of viscoelastic material. Thus, when the structural member is bent or flexed, the outermost layer of viscoelastic material is stressed as much as or more than the innermost one thereof, and effective damping of flexural movement of the structural member is obtained.

The above, and still further highly important objects and advantages of this invention will become apparent from the following detailed specification, appended claims and attached drawings.

Referring to the drawings, in which like reference characters indictate like parts throughout the several views:

FIG. 5 is a view in top plan of a modified form of the damping means of this invention;

FIG. 6 is a transverse section taken on the line 6—6 of FIG. 5, greatly enlarged in a vertical direction;

FIGS. 7 and 8 are composite views in top plan of the main damping bands or sheets and spacers respectively, of the damping means illustrated in FIGS. 5 and 6;

Figure 1:
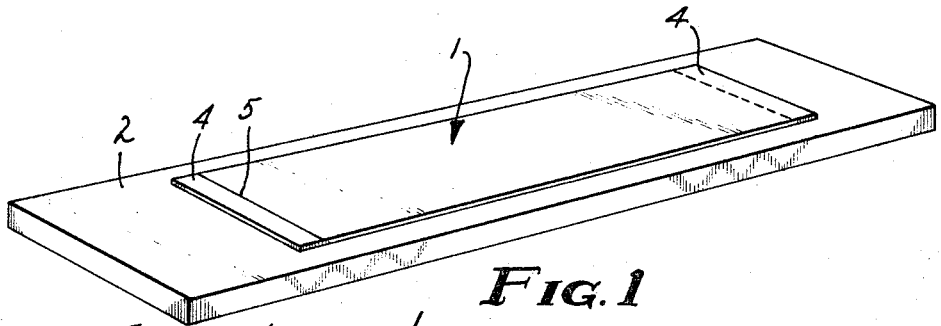
FIG. 1 is a view in perspective of a beam or other structural member with the damping means of this invention applied thereto.
Figure 2:
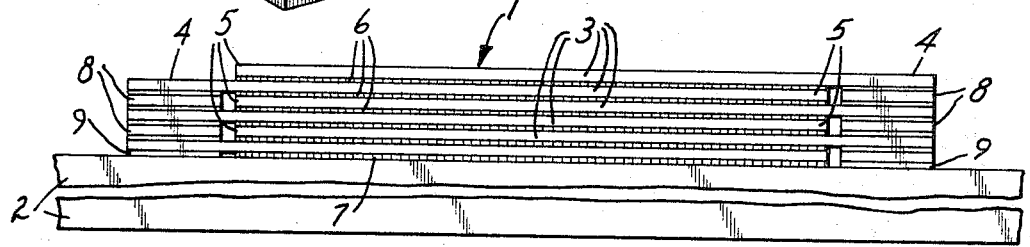
FIG. 2 is a view in side elevation of the beam and damping means of FIG. 1, slightly enlarged in a horizontal direction and greatly enlarged in a vertical direction, the structural member being disposed in a normal or unstrained condition.
Figure 3:
FIG. 3 is a view corresponding to FIG. 2, but showing the structural member and damping means in a flexed or strained condition.

In the embodiment of the invention illustrated in FIGS. 1–3, vibration damping means, indicated in its entirely by the reference character 1, is shown as being applied to a plate-like beam or structural member 2, this form of damping means being particularly adapted to damp uniaxial flexural bending of the structural member 2. The damping means 1 comprises a plurality of bands or sheets 3 of the flexible material, such as thin sheet metal or foil. As shown in FIGS. 2 and 3, alternate ones of the bands or sheets 3 have side edge or end portions 4 which project laterally outwardly of the adjacent side edges or ends 5 of adjacent bands or sheets 3 to provide anchoring portions at opposite sides or ends of the damping means 1. The several bands or sheets 3 are secured together by layers 6 of viscoelastic adhesive material having a substantially lower modulus of rigidity than the bands or sheets 3. The lowermost or innermost band is adhered to the underlying surface of the structural member 2 by a layer 7 of viscoelastic adhesive material similar to the layers 6. The anchoring portions 4 are separated by spacers 8 in laterally outwardly spaced relation to the adjacent side or end edges 5, the spacers 8 being rigidly secured to their adjacent end or edge portions 4 by known rigid structural adhesive, indicated at 9, the thickness of the spacers 8 being substantially equal to that of the bands 3. The anchoring end or edge 4 of the lowermost or innermost band 3 is also rigidly anchored to the underlying surface of the structural member 2 by rigid structural adhesive 9. At the opposite side or end of the damping means 1, the anchoring portion 4 of the next to the lowermost band or sheet 3 is anchored to the structural member 2 by an additional spacer 8 rigidly adhered to the adjacent anchoring portion 4 and the underlying surface of the structural member 2. Preferably, spacers 8 are laterally outwardly spaced from their adjacent edges 5 of the bands 3 and from the viscoelastic layers 6 and 7 a distance somewhat less than the thickness of the bands 3, to permit relative lateral movement between adjacent ones of the bands or sheets 3 during flexural bending movement of the structural member 2.

Under cyclic axial or flexural loading of the structural member 2, as shown in FIG. 3, the viscoelastic layers 6 and 7 are subjected to cyclic shear, as illustrated in FIG. 3. In FIG. 2, the unstressed condition of the viscoelastic layers 6 and 7 is illustrated by cross-hatch lines extending in a direction normal to the longitudinal dimension of the viscoelastic layers. In FIG. 3, the direction of the cross-hatch lines in the viscoelastic layers 6 and 7 indicates the shear stress which occurs in the layers 6 and 7 during flexing or bending of the structural member 2 in one direction. It will be noted that, due to the anchoring of the lateral outwardly projecting anchoring end or edge portions 4 to the structural member 2, each successive viscoelastic layer 6 outwardly from the structural member 2 is subject to as much or greater shear stress than the layers 6 inwardly thereof toward the structural member 2. Thus, the damping effect is approximately proportional to the number of bands 3 and viscoelastic layers 6, and the damping provided by this construction or treatment can be produced to the desired value.

The above described arrangement differs substantially from the type of surface treatment using thin multi-ply tape comprising alternate laminate of thin metal bands and viscoelastic adhesive, and wherein the bands are not anchored to the structural member surface. Such construction is shown in the Detrie et al. Patent 2,819,032. In the multi-ply tape structure, the innermost layer of adhesive, namely that which adheres the tape to the structural member, is subject to the greatest shear stress during flexural bending of the structural member, successive layers of the adhesive being subject to successively less shear strain. As a result, the additional damping realized by providing additional bands, as in the multi-ply arrangement, is generally limited. In fact, the damping of multiple tapes is approximately equal to that of a single adhesive layer constrained by a metal band and having a thickness equal to the sum of the individual layer thicknesses.

It will be appreciated that the thicknesses of the bands or sheets 3 and layers of viscoelastic material 6 and 7, as well as that of the spacers 8, is greatly exaggerated in FIGS. 2 and 3. Normally, the thickness of each sheet 3 and viscoelastic layer 6 or 7 is but a few thousands of an inch. As an example, longitudinal vibration or flexural bending in a test beam 3/16" thick, 1½" wide and 7" long was effectively damped by a test configuration similar to that illustrated in FIGS. 2 and 3, utilizing a total of five bands or sheets 3 of steel and each having a thickness of 0.006", each of the viscoelastic adhesive layers 6 and 7 being 0.002" thick. Thus, the overall thickness of the configuration was 0.040", the overall length thereof being 6" and the length of the adhesive layers 6 and 7 being 4". The adhesive used in the damping layers 6 and 7 was adhesive No. 466 manufactured and sold by the Minnesota Mining and Manufacturing Company of St. Paul, Minnesota, and the anchoring portions 4 and the spacers 8 were anchored together and to the structural member 2 with structural adhesive manufactured and sold by Minnesota Mining and Manufacturing Company under the name "Scotch Weld" E.C. 2158. This particular configuration provided maximum damping of vibration in the structural member 3 when the structural member 3 was firmly anchored at one end and the free end thereof subject to lateral strain and suddenly released. It will be appreciated that the number of bands 3 and intervening layers of viscoelastic adhesive 6 to be used in a given damping means produced in accordance with this invention, is dependent in a substantial degree to the strain energy stored in the structural member. Thus, with a structural member of less thickness than that indicated above, a less number of bands 3 is required for maximum damping.

While the bands or sheets 3 have been described above as being of steel or similar material, effective damping may be achieved by using bands or sheets 3 of elastic material bonded together in overlapping relationship by intervening layers 6 of structural adhesive having a lower modulus of rigidity than the elastic bands. In such an arrangement, the shear strains for damping vibration are set up in the elastic bands that are rigidly anchored at their opposite edges to spaced portions of the structural member to be damped.

Figure 4:
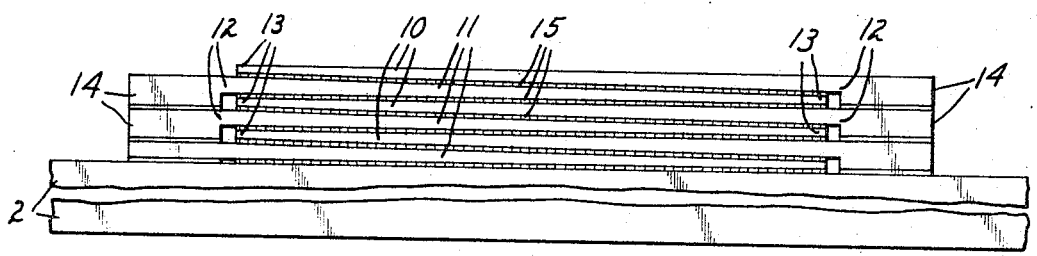
FIG. 4 is a view corresponding to FIG. 2 but showing a modified form of the invention.
Figure 9:
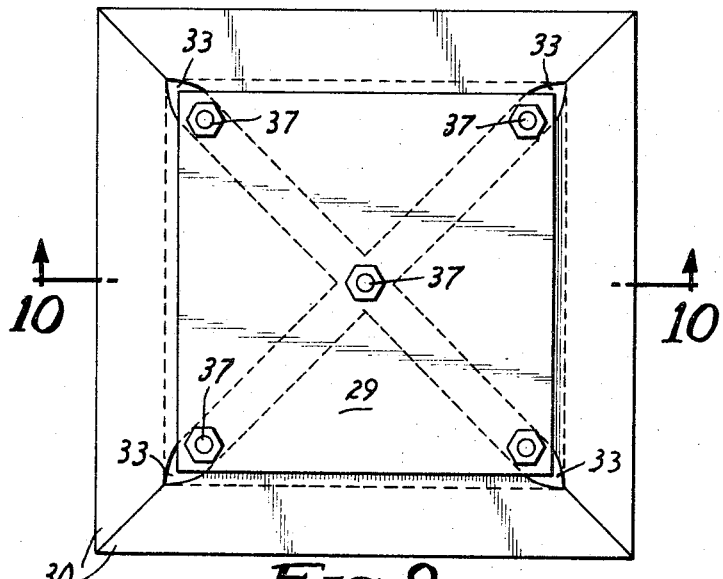
FIG. 9 is a view in top plan of another modified form.

In the modified embodiment of the invention illustrated in FIG. 4, vibration damping is effected in a structural member or beam 2 by damping means including a plurality of bands 10 and alternate bands 11, each of which taper from a relatively thick edge portion 12 to a relatively thin edge portion 13. As shown, the relatively thin edge portions 13 of the bands or sheets 11 terminate adjacent the relatively thick edge portions 12 of the alternate layers 10 and vice versa. At their thickened edge portions, the bands or sheets 10 and 11 are formed to provide anchoring portions 14, adjacent ones of which are rigidly secured together and to underlying portions of the structural member 2 by rigid structural adhesive or the like 9. Layers of viscoelastic material 15 are interposed between the bands 10 and 11 and between the innermost band 11 and the underlying structural member 2 in the manner above described in connection with FIGS. 1–3. The tapered bands or sheets 10 and 11 are stiffer and stronger than bands of even thickness and having an equal average thickness as that of the bands 10 and 11, thus leading generally to higher damping in the viscoelastic adhesive. Further, the added thickness at the edge portions 12 where no support is given to the bands 10 and 11 by adhesive 15, minimizes buckling of the bands 10 and 11 during flexural loading or bending of the structural member.

The above-described damping means are intended primarily for beams or other members where damping is dissipated in one direction of stress only. In plates, panels and other types of structural members, stress often occurs in two directions. The modified form illustrated in FIGS. 5–8 is found to be highly effective in damping biaxial stress, and comprises a plurality of cooperating sheet-like elements 16 and 17 and generally L-shaped spacers 18 and 19. As shown in FIGS. 7 and 8, the elements 16 and 17 are each formed to provide laterally outwardly projecting tabs 20 at one pair of diagonally opposed corners thereof, the tabs 20 defining opposite ends of L-shaped recesses which are adapted to receive respective ones of the L-shaped spacers 18 and 19. It will be noted, with reference to FIGS. 7 and 8, that the spacers 18 and 19 are so disposed relative to their respective sheet-like elements 16 and 17, that L-shaped spaces 21 are provided therebetween when the sheet-like elements and spacers are properly assembled and adhered to the structural member to be dampened. With reference to FIG. 6, it will be seen that the elements 16 and 17 are secured together and to the surface of the structural member, indicated at 22, by viscoelastic adhesive layers 23. When the elements 16 and 17 are arranged in a sandwich or stack, adjacent tabs 20 thereof are disposed in overlapping relationship, and the tabs 20 of adjacent elements, as well as the spacers 18 and 19 and overlapping portions of the elements 16 and 17 are rigidly secured together by rigid structural adhesive of the above-mentioned type and indicated at 24 in FIG. 6. Here also it will be seen that the lowermost sheet-like element and spacer are rigidly secured to the structural member 22 by the rigid structural adhesive 24, laterally outwardly of the viscoelastic layers 23. The areas of the sheet-like elements 16 and 17, shaded by broken cross-hatching in FIG. 7, and indicated by the reference character 25, are those to which the rigid structural adhesive 24 is applied. Thus, each element 16 and 17 is rigidly anchored to the structural member 22 along two adjacent side edge portions, the anchored side edge portions of the elements 16 being opposite those of the elements 17.

When the damping means illustrated in FIGS. 5–8 is applied to the structural member 22, a plurality of laterally spaced openings 26 are drilled through the overlapping elements 16 and 17 in alignment with the spaces 21, and the side edge portions of the elements 16 and 17, as well as the spacers 18 and 19 are cut to provide slots 27 that extend laterally outwardly from the openings 26, the slots 27 dividing the anchored edge portions of the elements 16 and 17 and the spacers 18 and 19 into anchoring sections 28. By thus dividing all of the side edges of a square or rectangular damping configuration into anchoring sections, surface strain in any direction in the structural member 22 will cause relative movement between the elements 16 and 17 and thus dissipate energy in the viscoelastic layers 23 therebetween.

Figure 10:
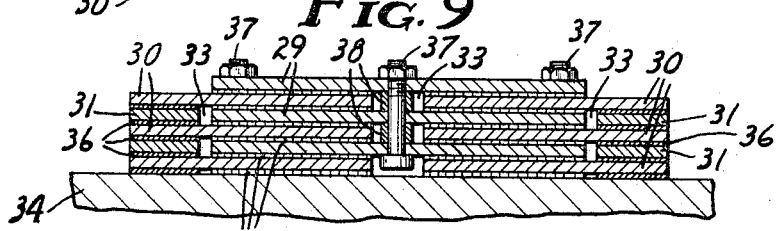
FIG. 10 is a transverse section taken on the line 10—10 of FIG. 9, greatly enlarged in a vertical direction.
Figure 11:
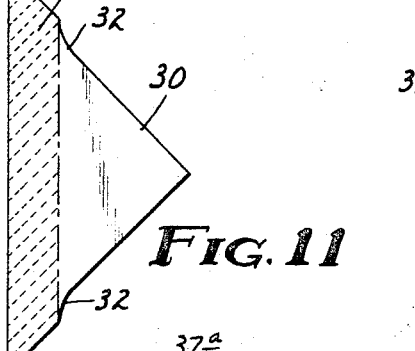
FIGS. 11 and 12 are views in top plan of damping bands or sheets and spacers respectively, of the damping means of FIGS. 9 and 10.
Figure 12:
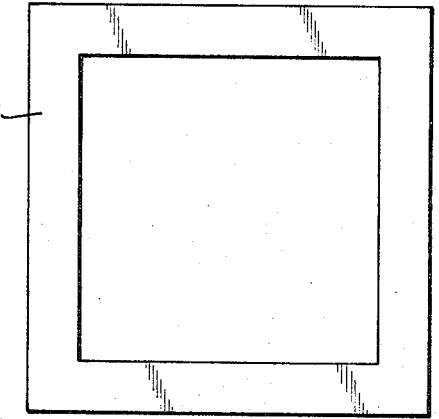

The modified form of damping means illustrated in FIGS. 9–12 comprises a plurality of square or rectangular sheet-like elements 29, a plurality of triangular elements 30 and spacer elements 31 in the form of hollow squares. The triangular elements 30 are generally in the form of right triangles having their base and altitude edges relieved, as indicated at 32 in FIG. 11, whereby, when four of the elements 30 are disposed in the manner illustrated in FIG. 9, the relieved edge portions 32 cooperate to define diagonal slots or openings 33. As shown in FIG. 10, the damping means comprises a plurality of layers of the elements 29 and 30, there being four elements 30 in each layer thereof, the layers of elements 29 and 30 being adhered together and the lowermost layer of elements 30 being adhered to the underlying surface of a structural member or panel 34 by layers 35 of viscoelastic adhesive material. The spacers 31 encompass all of the square or rectangular elements 29 except the uppermost or outermost one thereof, and in laterally outwardly spaced relation to the elements 29. The laterally outer or hypotenuse edge portions of the elements 30, and the spacers 31 are rigidly anchored together and to the underlying surface of the structural member 34 by layers 36 of rigid structural adhesive material. The elements 29 are rigidly held together by nut-equipped bolts or the like 37 and tubular spacers 38 disposed in the diagonal slots 33. The bolts 37 not only serve to rigidly lock the elements 29 against movement relative to each other, but also provide anchoring means for mounting electronic components or other attachments, not shown, if such is desired. Further, if desired, the anchored outer edge or hypotenuse portions of the elements 30 and the spacers 31 may be slotted in the manner described above in connection with the form illustrated in FIGS. 5–8, to provide for highly efficient biaxial damping.

Figure 13:
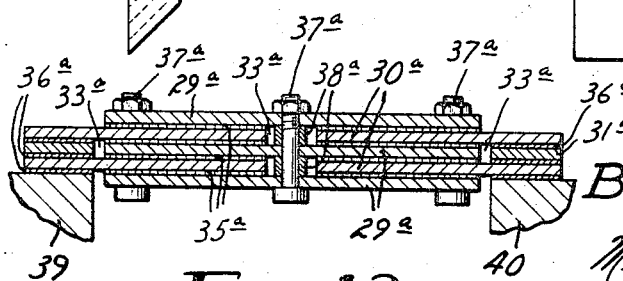
FIG. 13 is a view corresponding to FIG. 10 but showing a modified arrangement.

The modified arrangement illustrated in FIG. 13 demonstrates the manner in which a panel or beam produced in accordance with this invention may be self-dampening when used in a structure that is subject to bending or axial strains. In this arrangement, the lowermost lamina of the stack, made up of the triangular sheetlike elements 30, shown in FIG. 10, are removed, with the lowermost spacer element 31, and the remainder of the stack rigidly secured to spaced apart structural members 39 and 40. The various parts of the stack shown in FIG. 13 bear the same reference characters as corresponding parts shown in FIG. 10 with the suffix $a$ added. With the arrangement shown in FIG. 13, electrical or other components, not shown, can be mounted on or joined to either the outer or inner one of the panels or sheetlike elements 29$a$, of the bolts 37$a$, without restraining shear motion between the laminae or elements 29$a$ and 30$a$. The laminae 29$a$ are completely isolated from the structural members 39 and 40 by the viscoelastic layers 35$a$, these layers 35$a$ effectively damping whatever vibration which might otherwise be transferred from the members 39 and 40 to the sheetlike elements or laminae 29$a$.

From the above, it will be seen that I have not only provided apparatus for effectively damping vibration in structural members, but I have also provided a novel method for damping. After determining, by analysis or tests, what are the requirements for a maximum damping effect, I arrange or dispose a plurality of sheet-like elements of flexible material in overlapping generally parallel relationship to provide a stack of said elements with alternate ones of said elements each having a side edge portion projecting laterally outwardly of the adjacent edges of adjacent ones of said elements to provide anchoring portions at opposite side edges of the stack. In building up the stack, I interpose a plurality of layers of viscoelastic material having a different modulus of rigidity than said sheet-like elements one each between adjacent ones of said elements with opposite side edges of the layers of viscoelastic material laterally inwardly spaced from adjacent ones of the anchoring portions, whereby to connect said elements together in the stack thereof. The instant method further includes the adhering of the lowermost element of the stack in face-to-face relation to the structural member to be damped, with a layer of the viscoelastic material having side edges laterally inwardly spaced from said anchoring portions, and rigidly connecting adjacent anchoring portions together at the opposite side edges of the stack and rigidly connecting said anchoring portions to underlying portions of said structural member.

A variation or modification of the above-described method involves the building up of a stack or sandwich on the structural member to be damped. A sheet-like element of flexible material is adhered to a surface of a structural member with a layer of viscoelastic adhesive material in laterally inwardly spaced relation to one side edge portion of the sheet-like element, said one side edge portion being adhered to the underlying surface of the structural member by rigid structural adhesive material. A second sheet-like element is adhered to the outer surface of the first-mentioned element in overlapping face-to-face relationship therewith by a second layer of viscoelastic adhesive material, with a side edge portion of the second sheet-like element projecting laterally outwardly from the adjacent side edge of the first sheet-like element opposite the anchoring edge portion thereof, to provide said second sheet-like element with an anchoring edge portion which is rigidly anchored to the underlying surface of the structural member with rigid structural adhesive. Successive sheet-like elements are added in alternating fashion with interposed layers of viscoelastic adhesive material and rigid adhesive material to the overlapping portions and side edge anchoring portions respectively, until the sandwich or stack is built up to the required thickness for maximum damping.

From the above, it will be seen that, by providing a plurality of alternately anchored bands or sheets and interposed layers of viscoelastic material disposed intermediate the anchored portions of the bands, each viscoelastic layer is subject to as much or greater shear stress than the preceding or underlying layer thereof during cyclic strain in the associated structural member. Thus, each viscoelastic layer, above or outwardly of the innermost one thereof directly adhered to the structural member, dissipates an appreciable amount of energy during cyclic shear strains, and highly effective damping is achieved.

This invention has been thoroughly tested and found to be completely satisfactory for the accomplishment of the objectives set forth; and, while I have shown and described several forms which the invention may take, and a method for damping structural members, it will be understood that the same is capable of further modification without departure from the spirit and scope of the invention, as defined in the claims.

What I claim is:

1. Damping means for structural members, said damping means comprising a pair of inner and outer sheet-like elements of flexible material having inner and outer surfaces and disposed in overlapping spaced relationship, each of said elements having an edge portion projecting laterally outwardly of the adjacent edge of the other of said elements, a layer of adhesive material having a modulus of rigidity substantially different than that of said sheet-like elements and disposed between said elements and adhered to the opposed overlapping inner and outer surfaces of said outer and inner elements respectively, a second layer of said adhesive material having one surface adhered to the inner surface of said inner element laterally inwardly of the projecting edge portion thereof, said second layer of adhesive material having an opposite surface for direct adhesion to an underlying structural member surface, means for rigidly attaching the projecting edge portion of one of said elements to said underlying structural member surface, and means for rigidly attaching the other of said elements to an underlying structural member surface in laterally spaced relation to the projecting edge portion of said one of the elements.

2. The damping means according to claim 1 in which said sheet-like elements and layers of adhesive material are formed to the contour of the underlying structural member surface.

3. The damping means according to claim 1 in which each of said sheet-like elements is of greater thickness adjacent said projecting edge portion thereof than at the opposite side edge portion thereof.

4. The damping means according to claim 1 in which each of said sheet-like elements is of greater thickness at the portion thereof adjacent said projecting edge portion than at the opposite side edge thereof, the inner and outer surfaces of each of said elements tapering toward said opposite side edges, said first-mentioned layer of adhesive material being of substantially uniform thickness over the area thereof adhere to said elements.

5. The damping means according to claim 1 in which said means for attaching said other of said elements to an underlying structural member surface comprises a second inner sheet-like element of flexible material underlying said outer element in laterally spaced relation to said first-mentioned element and having inner and outer surfaces and an outer edge portion disposed laterally outwardly of said outer element, a third layer of adhesive material between said outer and second elements and adhered to the inner and outer surfaces of said outer and second inner elements respectively, a fourth layer of adhesive material adhered to the inner surface of said second inner element and adapted to be adhered to said underlying structural member surface, and means for rigidly attaching said outer edge portion of the second inner element to said structural member surface.

6. Damping means for structural members, said damping means comprising a pair of inner and outer sheet-like elements of flexible material each having inner and outer surfaces and disposed in overlapping spaced relationship, each of said elements having an edge portion projecting laterally outwardly of the adjacent edge of the other of said elements, a layer of viscoelastic material having a lower modulus of rigidity than said sheet-like elements disposed between said elements and adhered to the opposed overlapping inner and outer surfaces of said outer and inner elements respectively, a second layer of said viscoelastic material having one surface adhered to the inner surface of said inner element laterally inwardly of the projecting edge portion thereof, said second layer of viscoelastic material having an opposite surface adapted to be adhered directly to an underlying structural member surface, and means for rigidly attaching the projecting edge portion of each of said elements to said underlying structural element surface in laterally spaced relation to the projecting edge portion of the other of said elements and laterally outwardly of said layer of viscoelastic material.

7. Damping means for structural members, said damping means comprising a plurality of sheet-like elements of flexible non-elastic material disposed in overlapping spaced relationship to provide a stack of said elements, alternate ones of said elements each having a side edge portion disposed laterally outwardly of the adjacent edges of adjacent ones of said elements to provide anchoring portions at opposite side edges of said stack, layers of viscoelastic material disposed one each between a different pair of adjacent elements laterally inwardly of said anchoring portions and adhered to adjacent surfaces of said elements, a layer of viscoelastic material adhered to the lower surface of the lowermost one of said elements and adapted to be adhered to an underlying surface of a structural member, and means for rigidly securing the anchoring portions together at the opposite side edges of said stack and for rigidly securing said anchoring portions to the underlying surface of the structural member laterally outwardly of said last-mentioned layer of viscoelastic material.

8. The damping means according to claim 6 in which said laterally projecting edge portions each comprise a plurality of anchoring sections.

9. Damping means for structural members, said damping means comprising a plurality of generally rectangular sheet-like elements of flexible material disposed in overlapping spaced relationship, alternate ones of said elements having side edge portions disposed laterally outwardly of the adjacent side edges of adjacent ones of said elements to provide elongated anchoring strip portions at opposite side edges of said damping means, layers of viscoelastic material of predetermined thickness and having a modulus of rigidity lower than that of said elements and disposed one each between a different pair of adjacent elements laterally inwardly of said anchoring strip portions and adhered to adjacent surfaces of said elements, a layer of viscoelastic material adhered to the lower surface of the lowermost of said elements and adapted to be adhered to an underlying surface of a structural member, spacer means rigidly secured between adjacent ones of said anchoring strip portions, said spacer means being of a thickness substantially equal to that of said viscoelastic layers, and means for rigidly securing said anchoring strip portions and spacer means to the underlying surface of the structural member laterally outwardly of said last-mentioned layer of viscoelastic material.

10. The damping means according to claim 9 in which said anchoring strip portions and spacer means are laterally split to provide a plurality of anchoring sections at said opposite side edges of the damping means.

11. A damping assembly for use with structures subject to vibration, said assembly comprising a plurality of laminae having adjacent surfaces adhered together by layers of viscoelastic adhesive between adjacent ones of said laminae to provide a stack of said laminae, every other one of the laminae in said stack comprising a generally rectangular sheet-like member, alternate ones of said laminae comprising a plurality of sheet-like sections having inner edge portions spaced apart at the central portion of said stack and outer side edge portions projecting laterally outwardly of adjacent side edges of said sheet-like members to provide anchoring portions at opposite sides of said stack, and means for rigidly anchoring said anchoring portions to spaced portions of a structure.

12. The damping assembly defined in claim 11 in further combination with a layer of viscoelastic adhesive on the lowermost laminae of said stack for securing said stack to an underlying portion of said structure independently of said achoring portions.

13. The damping assembly defined in claim 11 in further combination with means rigidly connecting said sheet-like members together independently of said sheet-like sections.

14. The damping assembly defined in claim 13 in which said last-mentioned means include mounting elements for supporting other structure on said assembly independently of said first-mentioned structure.

References Cited
UNITED STATES PATENTS

| | | | |
|---|---|---|---|
| 3,159,249 | 12/1964 | Lazan | 188—1 |
| 3,160,549 | 12/1964 | Caldwell et al. | |
| 3,169,881 | 2/1965 | Bodine. | |

DUANE A. REGER, *Primary Examiner.*